Patented Jan. 10, 1939

2,143,830

UNITED STATES PATENT OFFICE 2,143,830

VAT DYESTUFFS DERIVED FROM 1,4,5,8-NAPHTHALENE-TETRA-CARBOXYLIC ACID AND A PROCESS OF PREPARING THEM

Wilhelm Eckert and Otto Braunsdorf, Frankfort-on-the-Main-Hochst, Germany, assignors to General Aniline Works, Inc., New York, N. Y., a corporation of Delaware No Drawing. Application September 23, 1935, Serial No. 41,830. In Germany September 26, 1934

4 Claims. (Cl. 260—282)

The present invention relates to vat dyestuffs derived from 1,4,5,8-naphthalene-tetra-carboxylic acid and to a process of preparing them.

In United States Letters Patent No. 1,588,451 new vat dyestuffs are described which are obtainable by condensing 1,4,5,8-naphthalene-tetra-carboxylic acids or derivatives thereof with ortho-diamines.

Now we have found that dyestuffs of the same or similar kind are obtainable by condensing a 1,4,5,8-naphthalene-tetra-carboxylic acid or the dianhydride thereof with an ortho-amino-azo-compound, for instance, one of the following type:

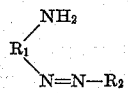

wherein $R_1$ and $R_2$ represent the same or different aryl groups, and by treating the condensation products obtained with a reducing agent, suitably in the presence of a diluent, so that double ring closure occurs with formation of two imidazole-rings. In the above formula the aryl group $R_1$ may, for instance, belong to the benzene or naphthalene series and contain any substituents. The aryl group $R_2$ may be of any character. Its value is immaterial in as much as it is split off during the course of the reaction.

The new reaction is of particular advantage in cases where it is difficult to isolate the respective ortho-diamine and where the dyestuff cannot be obtained according to the process of United States Letters Patent No. 1,588,451.

The following examples serve to illustrate the invention but they are not intended to limit it thereto, the parts being by weight:

(1) 30 parts of naphthalene-1,4,5,8-tetra-carboxylic acid or the corresponding quantity of its dianhydride are intimately mixed with 100 parts of 2-amino-4-methoxy-5-methyl-4'-methyl-1,1'-azobenzene and the mixture is heated for a short time at 180° C.–200° C. A dark thinly liquid melt is first obtained which soon solidifies. After about 30 minutes the reaction is complete. The melt is then treated with ethyl alcohol in order to dissolve the unattacked azo compound and the reaction product is separated by filtration with suction. In order to remove the unchanged naphthalene-tetra-carboxylic acid, the whole is treated with dilute sodium carbonate solution wherein the carboxylic acid is dissolved. The reaction product is a brown powder. It is sparingly soluble in organic solvents, melts above 300° C., dissolves in sulfuric acid to a yellowish red solution and yields a wine-red vat.

10 parts of the reaction product thus obtained from naphthalene-1,4,5,8-tetra-carboxylic acid with 2-amino-4-methoxy-5-methyl-4'-methyl-1,1'-azobenzene are suspended in 150-200 parts of glacial acetic acid, the suspension is heated to boiling and 25 parts of zinc dust are gradually added. The mixture gradually becomes darker. When unchanged starting material can no longer be detected the whole is filtered with suction and the solid matter is washed with hot glacial acetic acid and alcohol. There remains a mixture of zinc dust and of the leuco-compound of the dyestuff formed which may be separated from the zinc by vatting the dyestuff and filtering.

The dyestuff is obtained in the form of a dark violet powder; it dissolves in sulfuric acid to a red solution, yields a green vat which by reflected light has a red appearance and dyes cotton therefrom fast violet tints.

(2) By using instead of the substituted azobenzene mentioned in Example 1 the o-aminoazobenzene, a dyestuff is finally obtained, after reduction of the first-formed condensation product, which is identical with that described in Example 1 of United States Letters Patent No. 1,588,451.

(3) A mixture of 40 parts of naphthalene-1,4,5,8-tetra-carboxylic acid dianhydride and 100 parts of 2-amino-4-methoxy-5-methyl-4'-chloro-1,1'-azobenzene

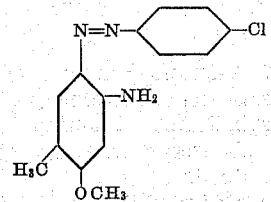

is heated. At about 180° C. a melt capable of being stirred is obtained; the temperature is then raised to about 200° C. and maintained until the melt gradually thickens with separation of the reaction product and finally solidifies nearly completely which is the case after about one hour. The mass is cooled somewhat and then freed from the azo-compound not consumed by treating it with warm benzene or toluene. The reaction product which probably has the formula:

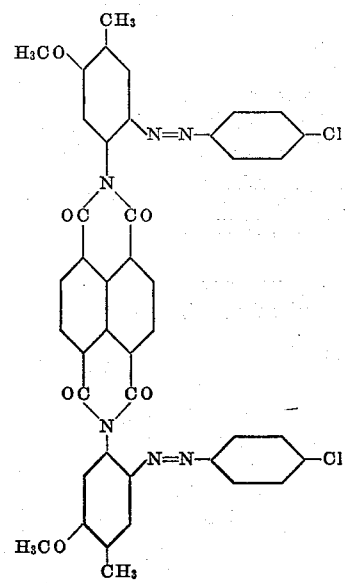

is obtained as a light brownish crystalline powder with a yield of about 80% of the theoretical. It is scarcely soluble in organic solvents, dissolves in concentrated sulfuric acid to a reddish-yellow solution and yields a bluish-red vat when warmed with dilute caustic soda solution and hydrosulfite. If this compound is reduced in the manner described in Example 1, there is obtained a dyestuff which corresponds in its properties with the dyestuff obtained according to Example 1 and probably is a mixture of isomeric dyestuffs of the following formulae:

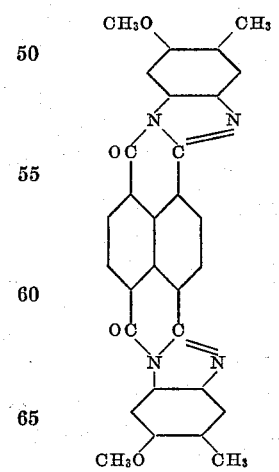 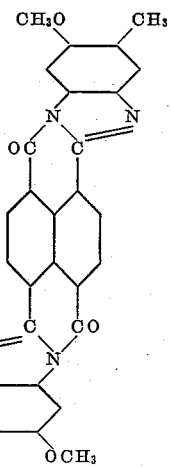

Instead of 2-amino-4-methoxy-5-methyl-4'-chloro-1,1'-azobenzene there may also be used differently substituted 2-amino-4-methoxy-5-methyl-1,1'-azobenzenes, in every case the same dyestuff is obtained.

(4) 200 parts of naphthalene-1,4,5,8-tetracarboxylic acid are intimately mixed with 500 parts of 2-amino-4.5-dimethyl-4'-methyl-1,1'-azobenzene:

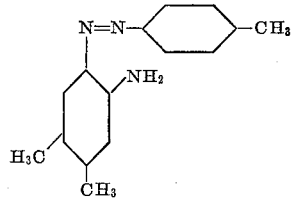

and the mixture is heated. At about 150° C. a thinly liquid melt is first obtained which when the temperature is further raised to about 200° C. soon thickens with elimination of steam.

The reaction product isolated from the cooled melt by means of benzene is a brownish, finely crystalline powder. It has no melting point, remains unchanged when heated to 360° C. and darkens in color above 360° C. It dissolves in sulfuric acid to a reddish-yellow solution and yields a bluish-red vat. The new compound has probably the following formula:

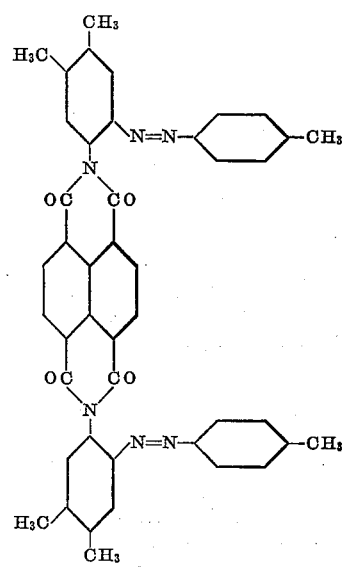

100 parts of the naphthalene-tetracarboxylic acid derivative thus obtained are dispersed, while stirring, in 12 to 15 times their weight of glacial acetic acid, heated to boiling and reduced, after addition of a small amount of water by gradual addition of sodium hydrosulfite. There is first obtained a dark red solution from which the leuco-compound of the dyestuff separates. This is filtered with suction, washed with water until neutral and dissolved as sodium salt. From the solution so obtained the dyestuff is precipitated by means of air. It is obtained as a red brown powder, yields an olive green hydrosulfite vat from which cotton is dyed in red brown tints of a very good fastness to washing, to chlorine and to boiling.

The dyestuff most probably constitutes a mixture of a two isomeric naphthoylenedibenzimidazoles substituted by methyl in 4,5,4',5' positions and corresponds with the dyestuff obtained from naphthalene-1,4,5,8-tetracarboxylic acid and 4,5-dimethyl-1,2-diaminobenzene.

We claim:

1. The process which comprises heating until melting a mixture of a compound of the group consisting of a naphthalene-1,4,5,8-tetracarboxylic acid and the dianhydride thereof with an ortho-amino-azo compound of the general formula:

$$NH_2-R_1-N=N-R_2$$

wherein $R_1$ represents a radical of the group consisting of phenyl and phenyl substituted by non-cyclic univalent substituents and $R_2$ represents any aryl radical and wherein the group $-NH_2$ and $-N=N-R_2$ stand in ortho-positions of $R_1$, and subjecting the product thus obtained to the action of a reducing agent.

2. The process which comprises melting at a temperature of about 180° C. to about 200° C. a mixture of a compound of the group consisting of a naphthalene-1,4,5,8-tetracarboxylic acid and the dianhydride thereof with an ortho-amino-azo compound of the general formula:

$$NH_2-R_1-N=N-R_2$$

wherein $R_1$ represents a radical of the group consisting of phenyl and phenyl substituted by non-cyclic univalent substituents and $R_2$ represents any aryl radical and wherein the group $-NH_2$ and $-N=N-R_2$ stand in ortho positions of $R_1$, and subjecting the product thus obtained to the action of a reducing agent.

3. The process which comprises melting at a temperature of about 180° C. to about 200° C. a mixture of a compound of the group consisting of a naphthalene-1,4,5,8-tetracarboxylic acid and the dianhydride thereof with an ortho-amino-azo compound of the general formula:

$$NH_2-R_1-N=N-R_2$$

wherein $R_1$ and $R_2$ represent radicals of the group consisting of phenyl and phenyl substituted by non-cyclic univalent substituents and wherein the group $-NH_2$ and $-N=N-R_2$ stand in ortho-positions of $R_1$, and subjecting the product thus obtained to the action of a reducing agent.

4. The process which comprises melting for half-an-hour at a temperature of about 180° C. to about 200° C. a mixture of naphthalene-1,4,5,8-tetracarboxylic acid with 2-amino-4-methoxy-5-methyl-4'-methyl-1,1'-azobenzene and treating the product thus obtained with zinc dust in the presence of boiling glacial acetic acid.

WILHELM ECKERT.
OTTO BRAUNSDORF.